Dec. 14, 1965  G. W. KLEES ETAL  3,222,863
AERODYNAMIC INLET
Filed Oct. 7, 1963  2 Sheets-Sheet 1
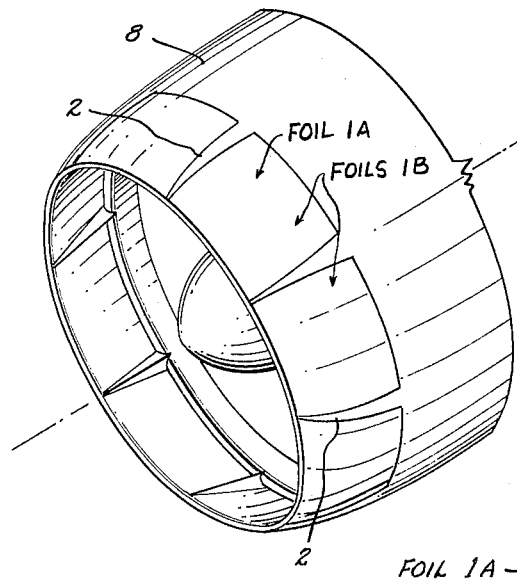
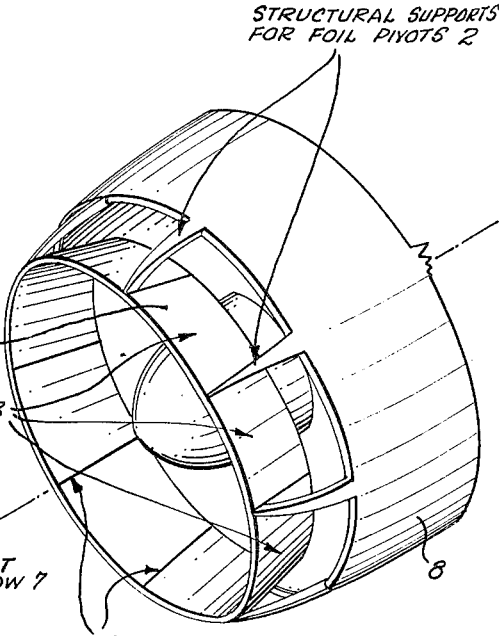
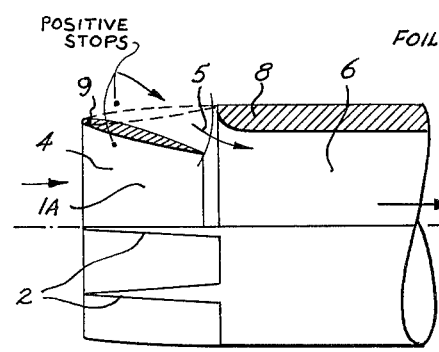
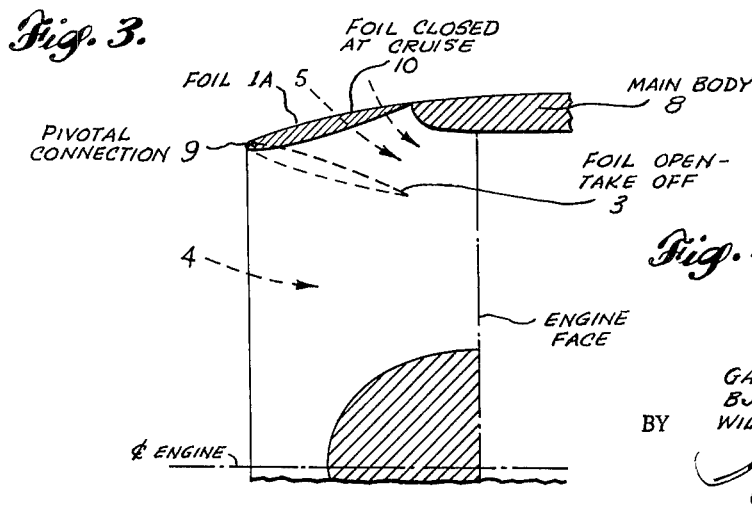
INVENTORS
GARRY W. KLEES
BJARNE E. SYLTEBO
WILTON S. VIALL
BY
ATTORNEY Dec. 14, 1965   G. W. KLEES ETAL   3,222,863
AERODYNAMIC INLET Filed Oct. 7, 1963   2 Sheets-Sheet 2

INVENTORS
GARRY W. KLEES
BJARNE E. SYLTEBO
BY WILTON S. VIALL

ATTORNEY

United States Patent Office
3,222,863
Patented Dec. 14, 1965

3,222,863
AERODYNAMIC INLET
Garry W. Klees, Mercer Island, Bjarne E. Syltebo, Bellevue, and Wilton S. Viall, Kent, Wash., assignors to The Boeing Company, Seattle, Wash., a corporation of Delaware
Filed Oct. 7, 1963, Ser. No. 314,136
15 Claims. (Cl. 60—35.6)

This invention relates to air inlets, and more particularly to air inlets for gaseous turbine aircraft engines.

With the coming in recent years of a greater spread in the speed range of different aircraft has come also a distinct need for aircraft inlets capable of performing adaptably and dependably at rather widely varying air speeds. While at one speed an air inlet may provide an efficient flow for the required volume of air, at another speed such volume of air may flow inefficiently.

In addition, there is now a more insistent need for air inlets to operate efficiently under various angles of attack, especially in the application to aircraft where a large decrement in inlet performance is intolerable during take-off, under crosswind conditions, or upon rotation of the aircraft.

In the prior art, one attempt to provide an inlet capable of efficient and flexible performance at different speeds has been to design an inlet generally of fixed geometry, constituting a compromise design yielding relatively good performance over the velocity range but often providing an inlet entry too small for optimal low speed inlet operation and, conversely, too large for minimal external drag at high speed.

In another attempt in the prior art to provide an adaptable air inlet, an air inlet was designed having an auxiliary passage located aft of the primary inlet, the auxiliary passage being in the form of a circumferential slot which is opened and closed by so-called blow-in doors. At a certain velocity of the carrier aircraft, such doors are closed by the pressure differential existing in the vicinity of the doors. The inlet thus provided, however, has not proved sufficiently satisfactory for several reasons, among which may be included the fact that the frontal area in an air inlet, such as in the one described, is large in comparison to the flow quantity of air required during high-speed flight. Also, the blow-in doors tend to fail to close at the most favorable point for optimal performance, i.e., the relative energy level of the injected flow has a tendency to dissipate as velocity increases. Further, the auxiliary passage in such an inlet is not aerodynamically clean, and flow losses are incurred, reducing the total energy of the flow of air at the point of usage.

Thus, it is an object of this invention to provide an air inlet capable of relatively high internal performance while in operation at different air speeds, including both low- and high-speed operation.

Another object is to provide an air inlet of low drag profile suitable for operation at a relatively high speed.

Still another object is to provide an air inlet of a design suitable for relatively undistorted air flow while operating over a comparatively wide range of adverse fluid field conditions, including varying angles of attack.

In an air inlet it is desirable to maintain a flow of air through the defined opening of the inlet without incurring a reduced flow capacity of the opening caused by vena contracta. Generally, to eliminate or substantially reduce vena contracta, the geometry of the inlet is altered to provide a smooth entry, allowing the air to flow through the defined opening at maximum capacity. Vena contracta will diminish if the inlet moves at some velocity relative to the remote static air fluid, or if the air fluid has a remote velocity relative to the inlet. As the velocity increases, the vena contracta decreases, and becomes zero when the velocity of the inlet relative to the fluid is exactly equal to the fluid within the inlet boundary.

A bellmouth opening, of course, tends to eliminate vena contracta by providing a smooth entry. An inlet with a bellmouth geometry, however, eventually restricts the relative motion of an aircraft, usually to a considerable extent as the velocity of the aircraft increases, due to the large frontal area of the bellmouth inlet. Therefore, an inlet should have the smallest possible frontal area if it is to travel at any appreciable velocity relative to the air fluid. The minimum frontal area of such an opening would be the boundary of the opening which will pass the desired flow without consideration being given to the manner in which the fluid is required to occupy such opening. An outstanding advantage of our invention is the achievement of low frontal area for high-speed operation with no sacrifice of flow capacity at any aircraft speed.

Another method of solving the problem of reduced air flow capacity caused by the vena contracta is to introduce the air fluid through auxiliary opening which may or may not remain open through the velocity range of the carrier aircraft. An auxiliary opening may or may not allow air flow in two directions, i.e., flow reversal through the auxiliary passages at some aircraft velocity.

As a result of the foregoing advantages, this invention will enable aircraft to take off from airfields having substantially shorter runways, the weight of the carrier aircraft will be reduced, the range of the carrier aircraft will be increased, the configuration of the inlet will result in lower drag, the carrier aircraft will cruise at a higher speed, any engine surge tendency will be diminished, an airflow growth potential will be provided without a need for major design of the inlet, and engine life will be lengthened and maintenance reduced, if such engine life is contingent upon the regree of distortion or efficiency.

The various embodiments of this invention have certain generic qualities. One such quality is that the inlets may apply to any vehicle operating in any fluid medium and requiring an extracted quantity of the fluid to enter the vehicle as a working medium, or for any reason whatsoever. Further, the principles of the invention may apply to any or all sides of any closed geometric shape; generally, any closed polygon of $n$ sides, $3 \leq n \leq \infty$. Also, while it is assumed that the air inlets in this invention will be traveling through a static fluid, it is understood that the operaton of a static inlet in a moving fluid is substantially identical. In addition, all inlets described herein are assumed to operate over a large velocity range, rather than at one specific velocity.

The invention may be more fully understood by reference to the drawings, in which certain preferred embodiments of the invention are shown solely by way of illustration, and not by way of limitation.

In the drawings:

FIG. 1 is a schematic illustration of an aircraft cowling having an air inlet such as the one described, showing the structural supports for the pivots and the foils in a closed position.

FIG. 2 is similar to FIG. 1, with the exception that the foils are shown in an open position.

FIG. 3 is a partial cross sectional view of a fluid dynamic foil, showing the primary and auxiliary flow passages.

FIG. 4 is an illustration of a portion of FIG. 3, showing the position of the foils at take-off and at cruise.

Figure 5:
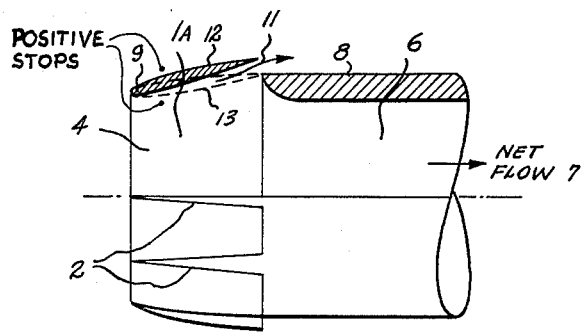
FIG. 5 is a variation of the configuration illustrated in FIG. 3.

The mechanical operation of one embodiment of this invention is shown in FIG. 1, in which the foils 1B are pivotally connected to structural supports 2 for the foil pivots, the structural supports also acting to form smooth joints between each foil when the foils 1B are in a closed position.

As illustrated in FIG. 2, the foils 1B come together in the full open position 3, and by virtue of their shape, form a surface resembling a conic frustum.

As in FIG. 3, during static operation the fluid dynamic foil 1A may be aligned with the stream, thus creating two flow passages, a primary flow passage 4 and an auxiliary flow passage 5, the two such passages merging into a net flow passage 6. The net flow along the latter passage is represented by reference number 7, showing the net flow passing through the main body of the cowling 8. Both the primary flow passage 4 and the auxiliary flow passage 5 have a minimum vena contracta because of the rapid acceleration of the air fluid caused by the resultant contracting passages. The foil 1A will support acceleration on both surfaces. In essence, the principle employed is to supply additional surfaces which are capable of turning the air fluid around the inlet boundary. By creating two passages, the effective radius of curvature of the air fluid flow is greatly increased with respect of such fluid turned. Looking at the inlet from the vena contracta concept, it can be seen that each passage approaches a bellmouth entry. Ideally, each of the passages should have a surface definition such that no vena contracta exists.

The boundary of the primary flow passage 4 can be minimal with no sacrifice in static or cruise performance; therefore, the inlet has very low drag potential and very high static flow capacity. A much smaller size passageway is required to capture a given quantity of fluid at high speed, as compared, of course, to a passageway operating on an aircraft while the aircraft is on the ground. The inlet provided by this invention, therefore, does not have to carry along an unnecessarily large passageway during high speed operation. In FIG. 4 the relative position of the foil at take-off position 3 is shown in comparison to the foil at cruise position 10. It is obvious to one skilled in the art that positive stops can be added to the inlet described to achieve optimal performance when the foils are open, but the foils may be permitted to seek an equilibrium position for any operating condition with no such stops required. There are many other mechanical amplifications and simplifications which can be made, depending upon the particular installation, but one of the principal features provided is a self-positioning foil 1A having pivot means 9 about a center providing acceleration flow passages 4 and 5 on each side of the foil 1A, when the foil 1A is in the open position.

The foil, being self-positioned, also yields optimal performance through the entire velocity range. To give the best performance, the surface design of the foil can be varied to control the point of closure of the foil at a pre-determined vehicle speed. The foil is aerodynamically stable, thus no elaborate damping devices are required to prevent erratic oscillation.

The inlet described also provides excellent performance under adverse conditions, such as in large angles of attack, since it is capable of asymmetric variations in geometry compatible with the flexible operation requirements of aircraft.

Further, the inlet can be designed so that the foil is self-aligning with the air flow, but this does not preclude the possibility of mechanically actuating the foil, if desired.

Also, the pivot point may be judiciously chosen to control the point of closure at a certain aircraft speed.

There are many choices as to the number of foils that can be used in a final configuration. The choice should depend ultimately on mechanical considerations. The inlet can also be very short, and does not require the additional length in fixed geometry inlets, the latter conversely requiring adequate length, for good diffuser operation. The subject invention does not require a diffuser; therefore, the inlet may be made as short as is feasibly possible. Especially attractive features of such a shortened inlet are reduced skin friction or drag, both external and internal, and lower weight.

The inlet configuration shown in FIG. 5 illustrates another embodiment of the invention. By virtue of the fact that the foil 1A in FIG. 5 may be rotated to the outward position 12 as well as to the inward position 13, this feature can be utilized to vary inlet velocity ratio and to achieve optimum flow conditions at the inlet lip. This is accomplished by rotating the foils outward and capturing a large quantity of air fluid than is required by the aircraft engine. The excess fluid is then expelled through the opening 11 provided by the outward rotated foil 1A at position 12. The improved flow conditions about the external surface result in lower drag.

The inlet has a combined capability: it provides static and take-off performance, cruise spill capability for varying velocity ratio to minimize drag, and high performance under adverse in-flow conditions, such as in high angle of attack.

Figure 6:
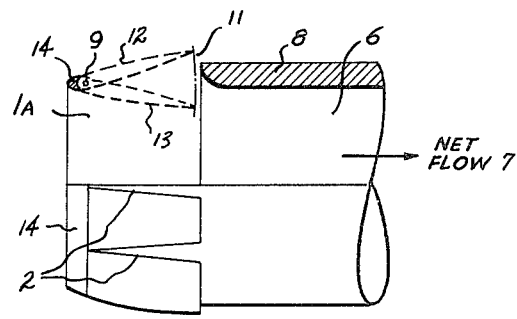
FIG. 6 is a variation of the configuration illustrated in FIG. 5.

As shown in FIG. 6, the addition of a fixed leading edge 14 allows a continuous structure at the inlet leading edge.

Figure 7:
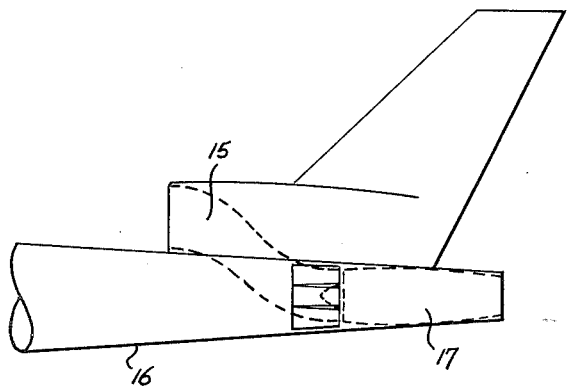
FIG. 7 is a schematic illustration of the configuration of FIG. 5 showing such configuration as a part of the fuselage of a Boeing 727 airplane.

The foregoing configuration is particularly suitable for application in a long ducted inlet, as illustrated in FIG. 7, in which such an inlet duct 15 is shown in the fuselage 16 of a Boeing 727.

Figure 8:
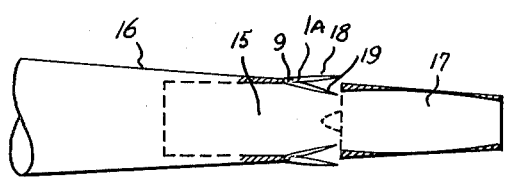
FIG. 8 is a partial cross sectional view of the configuration illustrated in FIG. 7.

In directing our attention to FIG. 8, we see the relationship of the inlet duct 15 to the foil 1A and the engine 17. The relative position of the foil 1A at the cruise position 18 is compared to the position of the foil 1A at the take-off position 19.

While we have shown and described particular embodiments of our invention, it will be obvious to those skilled in the art that various changes and modifications may be made therein without departing from our invention in its broader aspects.

We claim:

1. An air inlet for a power plant, comprising:
 (a) an engine housing having a principal air passageway disposed therein, said principal air passageway opening into said housing from an upstream portion thereof;
 (b) means upstream of said principal air passageway to provide ram air into said principal air passageway and to an external lateral surface of said engine housing;
 (c) a plurality of foils disposed upstream of said principal air passageway and pivotally connected to said engine housing, being connected in such a manner as to enable a downstream edge of each of said foils to move inward relative to said engine housing upon a decrease of air pressure within said principal air passageway, thus creating an auxiliary air passageway across each of said foils into said engine housing, and conversely, upon an increase of air pressure within said principal air passageway and at a desired pre-determined air pressure therein, to enable each of said foils to pivot outwardly relative to said engine housing.

2. An air inlet for a power plant, comprising:
 (a) an engine housing having a principal air passageway disposed therein, said principal air passageway opening into said housing from an upstream portion thereof;
 (b) a plurality of structural support members connected at a first end to an upstream portion of said engine housing and spaced at different positions relative to each other on said engine housing;
 (c) a plurality of foils, each of said foils being disposed between two adjacent support members and pivotally connected to said two adjacent support members, being connected in such a manner as to enable a downstream edge of each of said foils to move inward relative to said engine housing upon a decrease of air pressure within said principal air passageway, thus creating an auxiliary air passageway across each of said foils into said engine housing, and conversely, upon an increase of air pressure within said principal air passageway and at a desired pre-determined air pressure therein, to enable each of said foils to pivot outwardly relative to said engine housing, and upon a sufficient air pressure within said principal air passageway to pivot substantially flush with said engine housing.

3. Apparatus as defined in claim 2, in which said foils are constructed to form substantially aerodynamically smooth joints with said structural support members when said foils are pivoted substantially flush with said engine housing.

4. Apparatus as defined in claim 2, wherein said foils are constructed to resemble substantially a conic frustum when said foils are pivoted substantially flush with said engine housing.

5. Apparatus as defined in claim 2, wherein said foils are pivotally connected to said structural support members at pivot points thereon judiciously chosen to determine a desired point at which said foils respond to a certain air pressure within said principal air passageway.

6. Apparatus as defined in claim 2, including positive stop means to limit said outwardly pivoting of said foils to a point at which said foils close said auxiliary air passages and form a substantially smooth outer surface with an outer surface of said engine housing.

7. Apparatus as defined in claim 2, including means to permit said foils to pivot relative to said engine housing to a pre-determined maximum position external to said engine housing.

8. Apparatus as defined in claim 2, including a stationary, continuous leading edge means forward of said foils.

9. An air inlet for a power plant, comprising:
(a) an engine housing having a principal air passageway disposed therein, said principal air passageway opening into said housing from an upstream portion thereof;
(b) an inlet duct upstream from said engine housing and substantially coaxially aligned with said principal passageway opening;
(c) a plurality of foils pivotally connected to a downstream portion of said inlet duct and positioned relative to said engine housing in such a manner as to form a substantially aerodynamically smooth joint with said engine housing when said foils are aligned with said engine housing, said foils being connected in such a manner as to enable a downstream edge of each of said foils to move inward relative to said engine housing upon a decrease of air pressure within said principal air passageway, thus creating an auxiliary passageway across each of said foils into said engine housing, and conversely, upon an increase of air pressure within said principal air passageway and at a desired pre-determined air pressure therein, to enable each of said foils to pivot outwardly relative to said engine housing.

10. Apparatus as defined in claim 9, wherein said foils are pivotally connected to said inlet duct at pivot points thereon judiciously chosen to determine a desired point at which said foils respond to a certain air pressure within said principal air passageway.

11. Apparatus as defined in claim 9, including positive stop means to limit said outwardly pivoting of said foils to a point at which said foils are at a desired pre-determined position external to said engine housing.

12. Apparatus as defined in claim 9, including positive stop means to limit said outwardly pivoting of said foils to a point at which said foils close said auxiliary air passages and form a substantially smooth outer surface with an outer surface of aid engine housing.

13. Apparatus as defined in claim 9, including a stationary, continuous leading edge means forward of said foils.

14. Apparatus as defined in claim 9, in which said foils are constructed to form substantially aerodynamically smooth joints with a structural support means when said foils are pivoted substantially flush with said engine housing.

15. Apparatus as defined in claim 9, wherein said foils are constructed to resemble substantially a conic frustum when said foils are pivoted substantially flush with said engine housing.

References Cited by the Examiner
UNITED STATES PATENTS

| | | | |
|---|---|---|---|
| 2,604,278 | 7/1952 | Johnson | 244—53.8 |
| 2,699,906 | 1/1955 | Lee | 244—53.8 |
| 2,966,028 | 12/1960 | Johnson | 60—35.6 |

DONLEY J. STOCKING, *Primary Examiner.*